United States Patent
Inoko et al.

(10) Patent No.: US 9,864,263 B2
(45) Date of Patent: Jan. 9, 2018

(54) OPTICAL UNIT, OPTICAL APPARATUS USING THE SAME, LIGHT SOURCE APPARATUS, AND PROJECTION DISPLAY APPARATUS

(71) Applicant: CANON KABUSHIKI KAISHA, Tokyo (JP)

(72) Inventors: Kazuhiro Inoko, Utsunomiya (JP); Takashi Sudo, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 14/868,190

(22) Filed: Sep. 28, 2015

(65) Prior Publication Data

US 2016/0091785 A1    Mar. 31, 2016

(30) Foreign Application Priority Data

Sep. 30, 2014 (JP) ................... 2014-201811
Sep. 8, 2015 (JP) ................... 2015-176821

(51) Int. Cl.
*G03B 21/20* (2006.01)
*G02B 27/14* (2006.01)
*G02B 5/10* (2006.01)
*G02B 27/10* (2006.01)

(52) U.S. Cl.
CPC ........... *G03B 21/2066* (2013.01); *G02B 5/10* (2013.01); *G02B 27/106* (2013.01); *G02B 27/141* (2013.01); *G03B 21/204* (2013.01); *G03B 21/208* (2013.01); *G03B 21/2013* (2013.01)

(58) Field of Classification Search
CPC ...... G02B 27/106; G02B 27/141; G02B 5/10; G03B 21/2013; G03B 21/204; G03B 21/2066; G03B 21/208
See application file for complete search history.

(56) References Cited

U.S. PATENT DOCUMENTS

| 6,179,439 B1 | 1/2001 | Choate |
| 7,070,301 B2 | 7/2006 | Magarill |
| 7,222,968 B2 | 5/2007 | Magarill et al. |
| 8,167,440 B2 | 5/2012 | Sato et al. |
| 2008/0192336 A1 | 8/2008 | Ohzawa |
| 2013/0321777 A1 | 12/2013 | Wang et al. |
| 2014/0111775 A1 | 4/2014 | Nishikawa et al. |
| 2014/0247429 A1* | 9/2014 | Ogino ............... H04N 9/3111 353/31 |

(Continued)

FOREIGN PATENT DOCUMENTS

| CN | 1683990 A | 10/2005 |
| CN | 102147561 A | 8/2011 |
| CN | 103365051 A | 10/2013 |

(Continued)

*Primary Examiner* — Sultan Chowdhury
*Assistant Examiner* — Magda Cruz
(74) *Attorney, Agent, or Firm* — Canon USA Inc., IP Division

(57) ABSTRACT

An optical unit includes a plurality of paraboloid mirrors configured to reflect light fluxes from a plurality of LDs and to guide them to a concave lens. The light fluxes from the paraboloid mirrors are a plurality of convergent light fluxes, and the paraboloid mirrors reflect the light fluxes from the LDs such that as the convergent light fluxes travel farther away from the paraboloid mirrors, distances therebetween become shorter.

18 Claims, 5 Drawing Sheets

(56) References Cited

U.S. PATENT DOCUMENTS

2015/0234265 A1\* 8/2015 Takamatsu ......... G03B 21/2013
353/31

FOREIGN PATENT DOCUMENTS

| CN | 103775869 A | 5/2014 |
| CN | 103809292 A | 5/2014 |
| JP | 2004012620 A | 1/2004 |
| JP | 2011-065770 A | 3/2011 |
| JP | 2001-356404 A | 12/2011 |
| JP | 2012-118302 A | 6/2012 |
| JP | 2012-181260 A | 9/2012 |
| JP | 2013-080578 A | 5/2013 |
| JP | 2016-018594 A | 2/2016 |
| WO | 2014/073152 A1 | 5/2014 |

\* cited by examiner

OPTICAL UNIT, OPTICAL APPARATUS USING THE SAME, LIGHT SOURCE APPARATUS, AND PROJECTION DISPLAY APPARATUS

BACKGROUND OF THE INVENTION

Field of the Invention

The present invention relates to an optical unit, an optical apparatus using the same, a light source apparatus, and a projection display apparatus. The present invention particularly relates to a light source apparatus using a solid light source such as a semiconductor laser as a light source.

Description of the Related Art

In recent years, there has been developed a projector which irradiates a fluorescent body with light fluxes emitted from high-output laser diodes (LD) as excitation light and uses wavelength-converted fluorescent light.

It is presumed that many LDs are arranged and used to realize high luminescence with in a projector. However, light output of the LDs is reduced at a higher temperature, and thus when the LDs are densely arranged giving a priority to downsizing of the projector, the LDs give heat to each other and the light output of the LDs is reduced, which deteriorates brightness of a projected image.

For that reason, it is required that the LDs are arranged at wider intervals so that mutual heat effect is reduced as much as possible. However, when the arrangement intervals become wider, light fluxes exiting the group of LDs become thicker and a size of a subsequent optical element is also increased, which is not desirable in terms of cost and weight.

In light of the above problem, a technique for thinning light fluxes exiting a group of LDs as much as possible is described in Japanese Patent Application Laid-Open No. 2011-65770 and United States Patent Publication Application No. 2014/0111775.

Japanese Patent Application Laid-Open No. 2011-65770 discusses a technique in which a plurality of planar mirrors is provided in a traveling direction of light fluxes from a plurality of LDs and the angle of each of the planar mirrors is adjusted to condense the light on a fluorescent body.

United States Patent Publication Application No. 2014/0111775 discusses a technique in which one paraboloid mirror is provided in a traveling direction of light fluxes from a plurality of LDs and the light fluxes from the paraboloid mirror are reflected on a mirror to be condensed on a fluorescent body.

By employing the techniques discussed in Japanese Patent Application Laid-Open No. 2011-65770 and United States Patent Publication Application No. 2014/0111775, an increase in a size of the optical element can be prevented.

However, in the structure described in Japanese Patent Application Laid-Open No. 2011-65770, the reflective surfaces of the mirrors are planar and thus it is difficult to condense parallel light fluxes reflected on the mirrors to a small area on the fluorescent body.

If a condensing spot on the fluorescent body is large, parallelism of light lowers when the light is incident on the subsequent optical system, and light utilization efficiency can be deteriorated.

On the other hand, in the structure described in United States Patent Publication Application No. 2014/0111775, since a paraboloid mirror is used, convergent light fluxes from the paraboloid mirror are condensed on a small area on the fluorescent body, which prevents the deterioration in light utilization efficiency.

However, with the structure described in United States Patent Publication Application No. 2014/0111775, when the number of LDs increases to obtain higher luminance, the paraboloid mirror becomes wider in area and deeper, which may increase the size of the light source apparatus.

SUMMARY OF THE INVENTION

The present invention is directed to an optical apparatus capable of reducing a decrease in light utilization efficiency and achieving a smaller light source apparatus, a light source apparatus using the same, and a projection display apparatus.

According to an aspect of the present invention, an optical unit including a plurality of reflective surfaces configured to reflect light fluxes from a plurality of light sources and to guide the light fluxes to a lens unit, wherein the reflective surfaces is configured such that the light fluxes reflected on the reflective surfaces are a plurality of convergent light fluxes and a distance between each of the convergent light fluxes becomes shorter as the convergent light fluxes travel farther away from the reflective surfaces, the reflective surfaces are a plurality of concave mirrors, each of the concave mirrors is a part of a different one of a plurality of concave surfaces having a different shape from each other and the farther away a concave mirror out of the concave mirrors is positioned from the lens unit, the longer a focal distance of the concave mirror becomes.

Further features of the present invention will become apparent from the following description of exemplary embodiments with reference to the attached drawings.

DESCRIPTION OF THE EMBODIMENTS

An exemplary embodiment according to the present invention will be described below with reference to the drawings. The shapes or relative arrangements of the components described in the exemplary embodiment should be changed as needed based on a structure of an apparatus to which the present invention is applied, or various conditions. That is, the shapes or relative arrangements of the components are not defined to limit the scope of the present invention within the following exemplary embodiment.

[Structure of Projection Display Apparatus]

Figure 1:
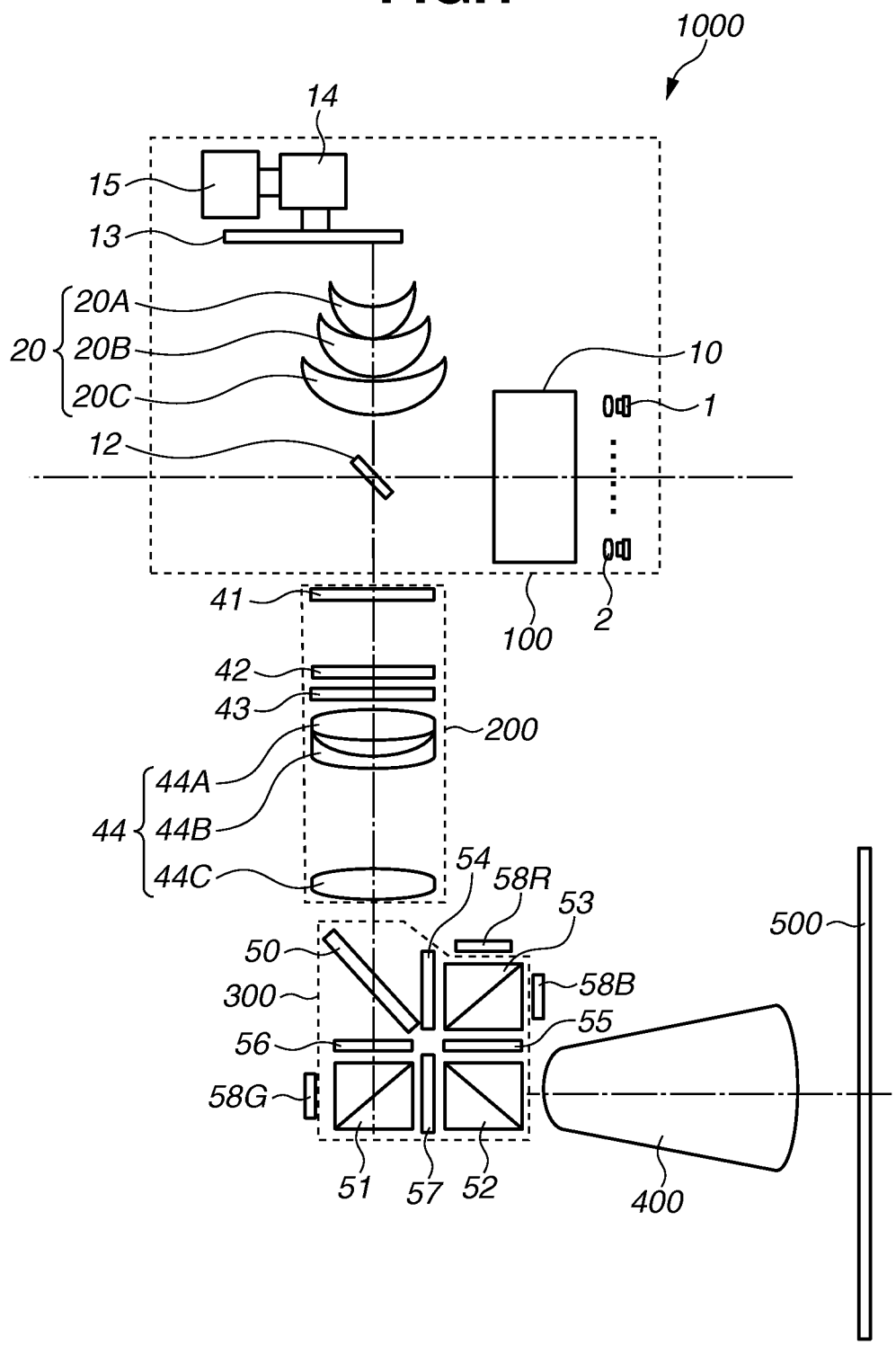
FIG. 1 is an explanatory diagram illustrating the structure of a projection display apparatus mounted with an optical apparatus and a light source apparatus according to an exemplary embodiment of the present invention.

The structure of a projector 1000 mounted with an optical apparatus according to the exemplary embodiment of the present invention will be first described with reference to FIG. 1.

The projector (projection display apparatus) 1000 includes a light source apparatus 100, an illumination optical system 200, a color separation-combination system 300, and a projection lens 400. With this structure, the projector 1000 can project an image on a screen 500.

The light source apparatus 100 includes a plurality of laser diodes 1 (LDs) as a light source, a plurality of collimator lenses (positive lenses) 2 on which a plurality of light fluxes emitted from the LDs 1 are incident, and an optical apparatus 10. The light source apparatus 100 further includes a dichroic mirror 12, a condenser lens unit 20, and a fluorescent body (wavelength conversion device) 13.

The light source apparatus 100 further includes a motor (drive unit) 14 configured to rotate the fluorescent body 13, and a base 15 configured to support the motor 14.

The LDs 1 emit blue light and the collimator lenses 2 convert divergent light fluxes emitted from the LDs 1 into parallel light fluxes. FIG. 1 illustrates only some of the LDs 1 and the collimator lenses 2 illustrated in FIGS. 2A to 5 as described below.

The fluorescent body 13 converts a part of the light fluxes transmitted from the optical apparatus 10 into fluorescent light (converted light) having a wavelength different from a wavelength of the light fluxes transmitted from the optical apparatus 10. Further, the fluorescent body 13 emits the fluorescent light and non-converted light which has the same wavelength as that of the light fluxes transmitted from the optical apparatus 10.

The fluorescent light includes green and red light flux and the non-converted light is a blue light flux according to the present exemplary embodiment.

The dichroic mirror 12 reflects the blue light flux which is compressed into a thin parallel light flux by the optical apparatus 10 described below, and guides the blue light flux to the fluorescent body 13 via the condenser lens unit 20.

According to the exemplary embodiment of the present invention, the condenser lens unit 20 includes three condenser lenses, namely, 20A, 20B, and 20C.

Further, the dichroic mirror 12 reflects the non-converted light out of the fluorescent light and the non-converted light travelling from the fluorescent body 13 via the condenser lens unit 20. On the other hand, the fluorescent light passes though the dichroic mirror 12 and is guided to the illumination optical system 200 described below. Further, out of the non-converted light from the fluorescent body 13, the non-converted light that is not incident on the dichroic mirror 12 is guided to the illumination optical system 200 described below.

In this way, according to the present exemplary embodiment, the blue non-converted light and the fluorescent light including the green and red light flux can be guided to the illumination optical system 200.

The optical apparatus 10 is described in the exemplary embodiment of the present invention, and a structure thereof is as follows.

The illumination optical system 200 guides light fluxes emitted from the light source apparatus 100 to the color separation-combination system 300 described below.

The light fluxes exiting the light source apparatus 100 are divided by a first fly-eye lens 41 and a second fly-eye lens 42. Further, the light fluxes exiting the light source apparatus 100 are converted into S-polarized light by a polarization conversion device 43. The S-polarized light is a light flux linearly polarized in the vertical direction to the sheet.

A condenser lens unit 44 condenses the light fluxes exiting the polarization conversion device 43 in such a manner as to illuminate liquid crystal panels 58 (58R, 58G, and 58B) described below in an overlapping manner.

In addition, the condenser lens unit 44 according to the exemplary embodiment of the present invention includes three condenser lenses, namely, 44A, 44B, and 44C.

The color separation-combination system 300 separates the light flux from the illumination optical system 200 by wavelength, combines image light to be displayed on the screen, and guides the image light to the projection lens 400 described below.

A dichroic mirror 50 has a property of reflecting red light (R light) and blue light (B light) and transmitting green light (G light). The R light and B light reflected on the dichroic mirror 50 are incident on a wavelength selective phase plate 54. The wavelength selective phase plate 54 has a property of giving a phase difference corresponding to half wavelength to the B light and giving no phase difference to the R light. Accordingly, the B light incident on the wavelength selective phase plate 54 changes into P-polarized light and the R light changes into the S-polarized light, both of which are incident on a polarization beam splitter (PBS) 53 described below. The P-polarized light is a light flux linearly polarized in the horizontal direction of the sheet.

The PBS 53 has a property of transmitting the P-polarized light and reflecting the S-polarized light. Thus, the B light transmits through the PBS 53 and is incident onto the liquid crystal panel 58B. The R light is reflected on the PBS 53 and is incident on the liquid crystal panel 58R.

On the other hand, the G light transmitting through the dichroic mirror 50 passes through a dummy glass 56 configured to adjust an optical path length, and then is incident on a PBS 51. The PBS 51 has a property of transmitting the P-polarized light and reflecting the S-polarized light, and thus the G light is reflected by the PBS 51 and is incident on the liquid crystal panel 58G.

A manner that the light fluxes emitted from the light source apparatus 100 are incident on the liquid crystal panels 58 has been described above. A manner that image light exits the liquid crystal panels 58 and an image is projected on the screen 500 will be described below. The image light is a light flux for displaying an image to be projected on the screen 500.

Light flux incident on each of the liquid crystal panels (light modulation devices) 58 is given a phase difference so that the light flux has a desired polarization direction according to the modulation state of a pixel arranged on the liquid crystal panels 58. Among the light fluxes given a phase difference, a component showing the same polarization direction as the light flux emitted from the light source apparatus 100 returns to the light source apparatus 100 side and is excluded from the image light. On the other hand, a component showing a polarization direction differing 90 degrees from the light flux emitted from the light source apparatus 100 is guided to a combination prism 32.

When the R light emitted from the light source apparatus 100 is converted from the S-polarized light into the P-polarized light by the liquid crystal panel 58R for R light, the R light converted into the P-polarized light transmits through the PBS 53 and is incident on a wavelength selective phase plate 55. The wavelength selective phase plate 55 has a property of giving no phase difference to the B light and giving a phase difference corresponding to half wavelength to the R light. Therefore, the R light transmitting through the wavelength selective phase plate 55 is incident on a combination prism 52 as the S-polarized light.

When the B light emitted from the light source apparatus 100 is converted from the P-polarized light into the S-polarized light by the liquid crystal panel 58B for the B light, the S-polarized light is reflected by the PBS 53 and transmits through the wavelength selective phase plate 55. The wavelength selective phase plate 55 gives no phase difference to the B light, and thus the B light having the S-polarized light is incident on the combination prism 52.

When the G light emitted from the light source apparatus 100 is converted from the S-polarized light into the P-polarized light by the liquid crystal panel 58G for G light, the P-polarized light transmits through the PBS 51 and is incident on a dummy glass 57 configured to adjust an optical path length. The G light transmitting through the dummy glass 57 is incident on the combination prism 52.

Since the combination prism 52 has a property of transmitting the P-polarized light and reflecting the S-polarized light, when the above-described modulation is performed, the G light transmits through the combination prism 52, and B light and R light are reflected by the combination prism 52 to be guided to the projection lens 400. Consequently, a color image can be projected on the screen 500 via the projection lens 400.

A first exemplary embodiment according to the present invention will be described below. The structure of the light source apparatus mounted with the optical apparatus according to the first exemplary embodiment of the present invention will be described with reference to FIGS. 2A to 5.

Figure 2A:
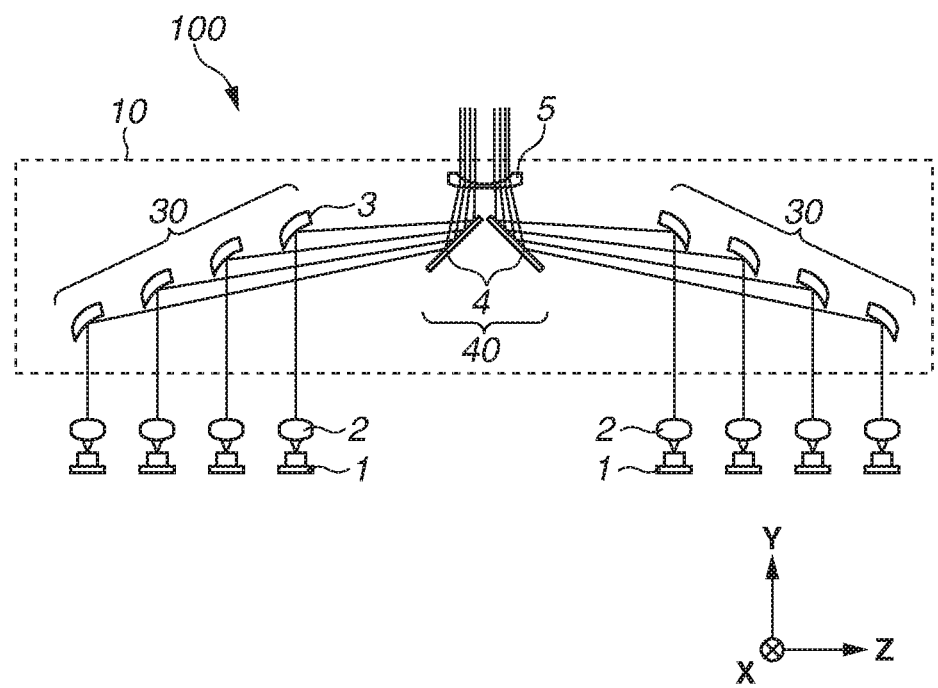
FIGS. 2A and 2B are the explanatory diagrams illustrating the structure of the light source apparatus according to the exemplary embodiment of the present invention.
Figure 2B:
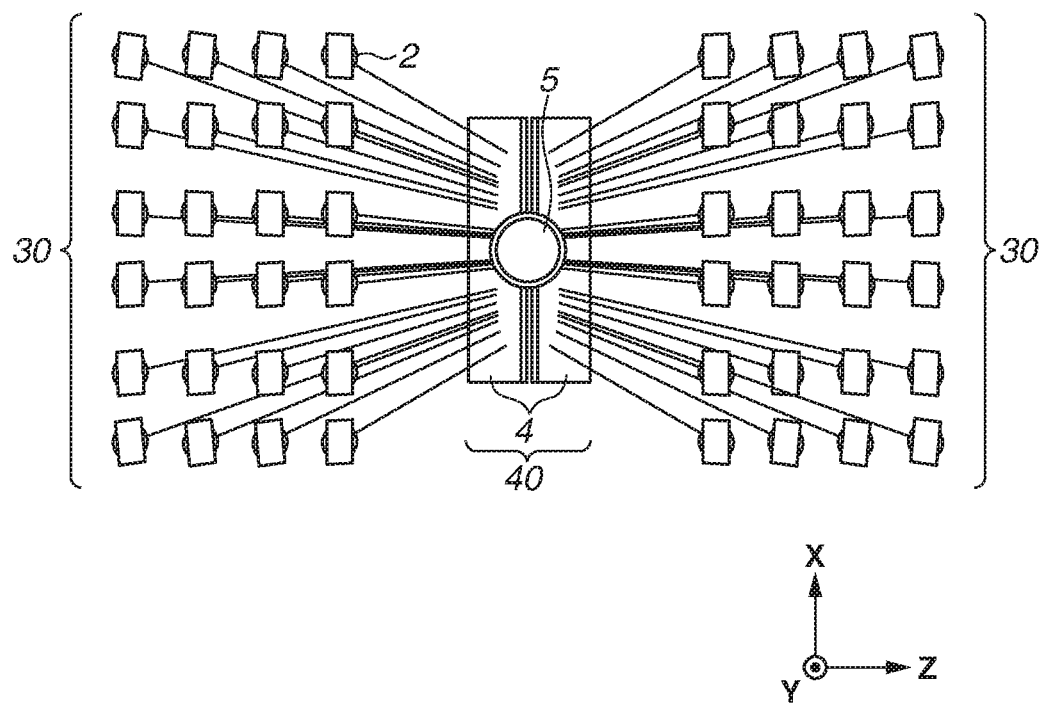

FIGS. 2A and 2B are diagrams illustrating the structure of the light source apparatus mounted with the optical apparatus according to the present exemplary embodiment. FIG. 2A is a projection diagram onto the YZ cross-section and FIG. 2B is a projection diagram onto the XZ cross-section.

In FIGS. 2A to 5, the direction parallel to the optical axis of a concave lens 5 (described below) is referred to as Y axis direction, the direction orthogonal to the Y axis and parallel to the long sides of the reflective surfaces of the planar mirrors 4 (described below) is referred to as X axis direction, and the direction orthogonal to the Y axis direction and the X axis direction is referred to as Z axis direction.

The optical apparatus 10 includes a plurality of paraboloid mirrors (reflective surfaces) 3. The optical apparatus 10 further includes the concave lens (lens unit) 5 and a mirror unit 40.

The light source apparatus 100 includes the plurality of LDs 1 and the collimator lenses 2 in addition to the optical apparatus 10 described above, and is configured to emit a compressed parallel light flux from the concave lens 5. In the present exemplary embodiment, the plurality of paraboloid mirrors 3 will be collectively referred to as a paraboloid mirror array (optical unit) 30 and the planar mirrors 4 will be collectively referred to as a mirror unit 40. A prism including a plurality of reflective surfaces may be employed instead of the mirror unit 40. The prism is configured to guide a light flux transmitted from the paraboloid mirror array 30 to the concave lens 5 as in the mirror unit 40.

A manner that light fluxes from the LDs 1 travel toward the paraboloid mirror array 30 via the collimator lenses 2 will be first described.

As described above, since the light fluxes exiting the LDs 1 are divergent light fluxes, providing only the LDs 1 would increase the size of the subsequent optical element. Thus, the collimator lenses 2 are provided such that the light flux exiting the LDs 1 immediately enters the collimator lenses 2. Accordingly, the divergent light fluxes emitted from the LDs 1 are turned into parallel light fluxes by the collimator lenses 2, and thus preventing an increase in size of the optical element.

The light flux from the collimator lenses 2 may not be completely parallel and may be slightly divergent or slightly convergent within a range usable for the operation of the apparatus.

In the present exemplary embodiment, as illustrated in FIGS. 2A and 2B, two groups of LDs, each of which includes 24 LDs in total (six rows in the X axis direction and four columns in the Z axis direction) are symmetrically provided about the concave lens 5. The number of LDs 1 is 48.

The following describes how the light flux exiting from the collimator lenses 2 travels toward the planar mirrors 4 via the paraboloid mirror arrays 30.

Figure 3A:
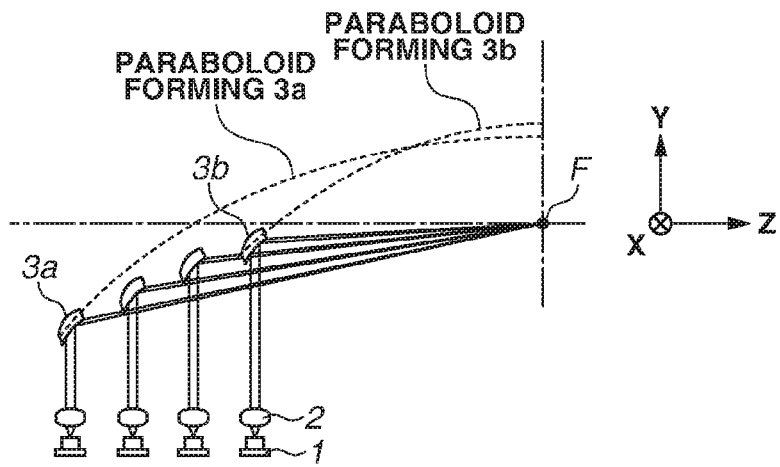
FIGS. 3A, 3B, and 3C are the explanatory diagrams of a paraboloid mirror array according to the exemplary embodiment of the present invention.
Figure 3B:
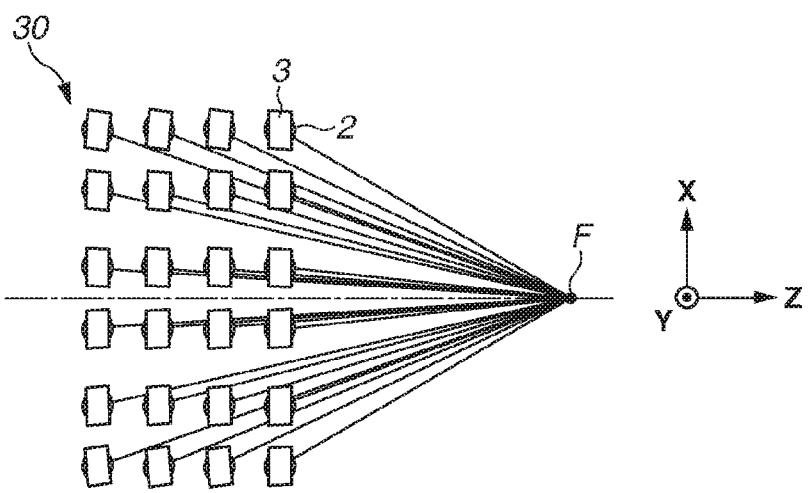
Figure 3C:
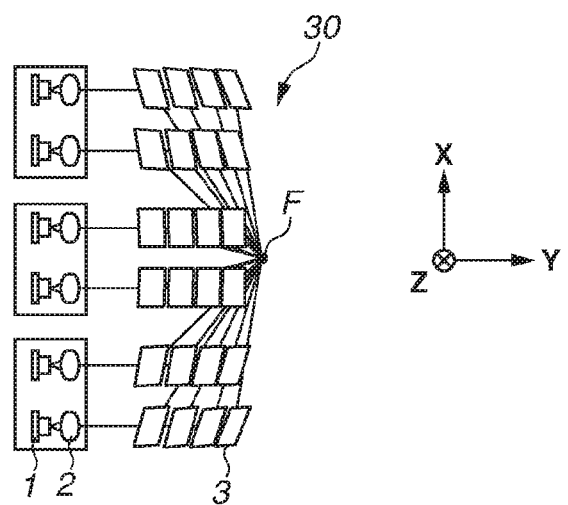

FIGS. 3A, 3B, and 3C are diagrams illustrating the function of the paraboloid mirror array 30. FIG. 3A is a projection diagram onto the YZ cross-section, FIG. 3B is a projection diagram onto the XZ cross-section, and FIG. 3C is a projection diagram onto the XY cross-section.

In FIGS. 3A, 3B, and 3C, the above-described mirror unit 40 and the concave lens 5 are omitted to explain the function of the paraboloid mirror array 30. In FIGS. 3A, 3B, and 3C, only one of the two paraboloid mirror arrays 30 is illustrated.

As illustrated in FIG. 3A, it can be seen that the paraboloid mirror array 30 converts parallel light fluxes coming from the plurality of collimator lenses 2 into convergent light fluxes, and the convergent light fluxes from the paraboloid mirror array 30 condense to a focal point F.

More specifically, the plurality of paraboloid mirrors 3 converts the parallel light fluxes from the LDs 1 into the convergent light fluxes, and reflect the parallel light fluxes emitted from the LDs 1 such that the distance between each of the convergent light fluxes becomes closer as they travel away from the paraboloid mirrors 3.

In other words, center light beams of the light fluxes emitted from the LDs 1 travel, while decreasing their mutual distances, toward the concave lens 5 via the paraboloid mirrors 3.

In other words, a plurality of the light beams each passing through the optical axis of the corresponding collimator lens 2 travels, while decreasing their mutual distances, toward the concave lens 5 via the paraboloid mirrors 3.

As illustrated in FIG. 3A, it is desirable that the paraboloid mirror array 30 is configured such that the focal point F where the light fluxes exiting the paraboloid mirrors 3 converge is positioned opposite to the LDs 1 and the collimator lenses 2 with reference to the paraboloid mirror array 30 (in the positive Y direction). Thus, the light fluxes from the paraboloid mirrors 3 can be made thinner than in a case where the focal point F is positioned on the same side as the LDs 1 and the collimator lenses 2, with reference to the paraboloid mirror array 3 (in the negative Y direction). In other words, the cross-section of the convergent light flux exiting the paraboloid mirror 3 can be made much smaller. Consequently, the light flux from the concave lens 5 can be thinner and the subsequent optical system can be further downsized.

In other words, the paraboloid mirror 3 is configured such that an angle formed between a normal line where a main light beam of the light flux from a light source crosses the paraboloid mirror 3, and the main light beam, is 45 degrees or more. In further other words, the paraboloid mirror array 30 is configured such that an angle formed between the center line of a circular cone circumscribed by the convergent light fluxes from the paraboloid mirrors 3 and the main light beam is 90 degrees or more.

All the paraboloid mirrors 3 do not need to be configured as described above. Only one of the paraboloid mirrors 3 may be configured in the above-described manner. It is more desirable that more than a half of the paraboloid mirrors 3 are configured in the above-described manner. That is, it is desirable that at least one of the paraboloid mirrors 3 can be configured such that a light flux from this paraboloid mirror 3 comes closer to the optical axis direction of the concave lens 5 as the light flux travels away from the paraboloid mirror 3.

While the paraboloid mirrors 3 has a focal point F common to paraboloid surfaces, each of the paraboloid mirrors 3 is arranged at a mutually different position. As a result, the paraboloid mirrors 3 are different in their shapes from each other. With the different shapes, the light fluxes exiting from the plurality of paraboloid mirrors 3 can be condensed onto the focal point F.

More specifically, as illustrated in FIG. 3A, out of the paraboloid mirrors 3 in the YZ cross-section, compare a shape of a paraboloid mirror 3a closest to the optical axis of the concave lens 5 with that of a paraboloid mirror 3b farthest from the optical axis of the concave lens 5. From the comparison of both shapes, it can be seen that a paraboloid vertex position and a paraxial curvature radius are different from each other.

That is, the vertex positions of the paraboloid mirrors 3a and 3b are different from each other, but the focal points thereof are common, i.e. the focal point F.

The paraboloid mirror 3a and paraboloid mirror 3b are provided at mutually different positions in the YZ cross-section. However, the focal distances of the paraboloid mirrors 3a and 3b are different from each other, so that the paraboloid mirrors 3a and 3b have the common focal point F.

More specifically, the paraboloid mirror array 30 is configured such that the farther away the paraboloid mirror 3 is separated from the optical axis of the concave lens 5, the longer the focal distance becomes.

If all the paraboloid mirrors 3 each form a part of an identical paraboloid shape, it would be difficult to condense the convergent light fluxes transmitted from the paraboloid mirrors 3 onto one point.

Further, if all the paraboloid mirrors 3 each form a part of an identical paraboloid shape, when the positions of the plurality of paraboloid mirrors 3 are adjusted in such a manner as to link the paraboloid mirrors 3 to condense the convergent light fluxes transmitted from the paraboloid mirrors 3 onto one point, a continuous-shaped paraboloid would be formed. With such a structure, a size of the paraboloid mirror array 30 may increase as compared with the structure according to the present exemplary embodiment.

When the paraboloid mirror array 30 is increased in its size, the light flux from the paraboloid mirror array 30 becomes thicker, and thus the mirror unit 40 and the concave lens 5 would also increase in their sizes.

Assume that a structure in which a continuous-shaped paraboloid mirror is employed without increasing the size of the mirror unit and the concave lens. In such a structure, when paraboloid mirrors are symmetrically provided with respect to the optical axis of the concave lens as in the present exemplary embodiment, the distance between the right and left paraboloid mirrors needs to be wider than in the structure according to the present exemplary embodiment. Accordingly, the entire light source apparatus would be increased in its size.

If only one paraboloid mirror is used, the mirror unit and the concave lens need to be provided farther away from the paraboloid mirror than in the structure according to the present exemplary embodiment. Thus, the entire light source apparatus would be increased in its size in such a case.

That is, in the structure according to the present exemplary embodiment where the paraboloid mirrors 3 each form a part of a different paraboloid shape, the farther paraboloid mirrors 3 are separated from the concave lens 5, the longer focal distances they have. Therefore, an increase of the apparatus size is prevented.

The fact that the paraboloid mirrors 3 are different from each other in their shapes indicates that the paraboloid mirrors 3 have mutually different focal distances.

Further, the fact that the farther paraboloid mirrors 3 are separated from the concave lens 5, the longer focal distances, indicates that paraboloid mirrors 3 closer to the LDs 1 have longer focal distances.

The fact that paraboloid mirrors 3 are farther away from the concave lens 5 indicates that the optical path lengths from the paraboloid mirrors 3 to the concave lens 5 are longer or that the paraboloid mirrors 3 are positioned away from the concave lens 5, or both.

Further, with the paraboloid mirror array 30 according to the present exemplary embodiment, a plurality of the convergent light fluxes from the paraboloid mirrors 3 can be condensed onto one point, and thus parallelism of the light fluxes exiting the fluorescent body can be enhanced.

A surface including the optical axis of the concave lens 5 and parallel to the long side of the mirror unit 40 is referred to as a first cross-section, and a surface orthogonal to the first cross-section and including the optical axis of the concave lens 5 is referred to as a second cross-section. Out of paraboloid mirrors 3, paraboloid mirrors 3 (reflective surfaces) provided symmetrically with reference to the first cross-section or the second cross-section is a part of an identical paraboloid shape. According to the present exemplary embodiment, the first cross-section is the XY cross-section and the second cross-section is the YZ cross-section.

In other words, out of the paraboloid mirrors 3, paraboloid mirrors 3 positioned at the same distance from the optical axis of the concave lens 5 in the XZ cross-section form a part of the same paraboloid shape. With the structure of the paraboloid mirror array 30, even when the paraboloid mirror arrays 30 are symmetrically provided with reference to the optical axis of the concave lens 5 as illustrated in FIG. 2A, the plurality of convergent light fluxes from the paraboloid mirror arrays 30 can be condensed onto one point.

Figure 4:
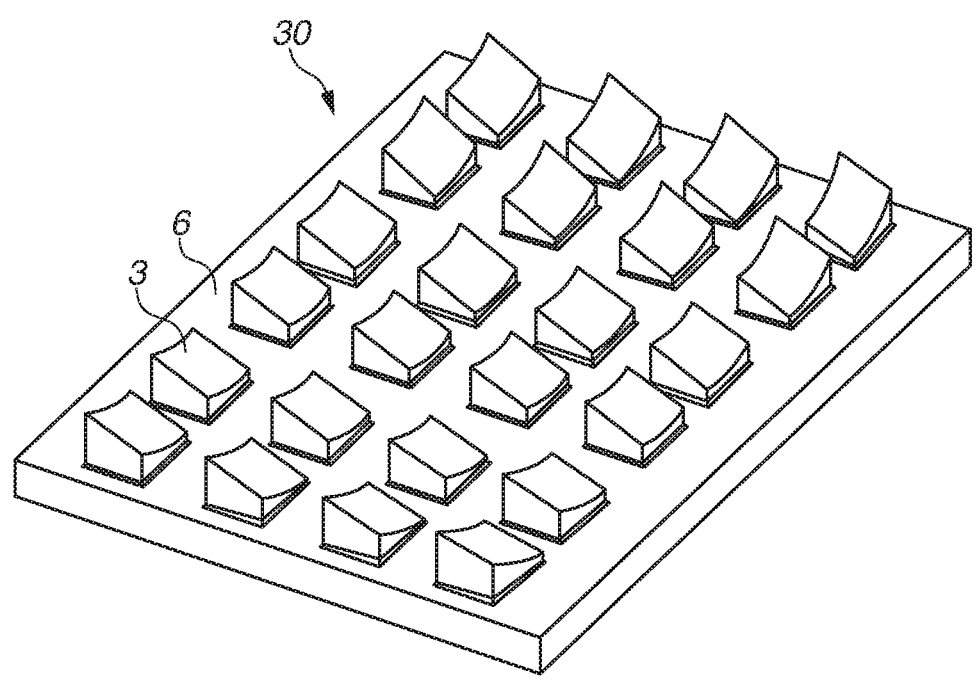
FIG. 4 is an image diagram of the paraboloid mirror array according to the exemplary embodiment of the present invention.

As illustrated in FIG. 4, the paraboloid mirror array 30 is configured as one optical element. More specifically, the plurality of paraboloid mirrors 3 is discontinuously provided on a base member 6. In other words, the paraboloid mirrors 3 are provided on the base member 6 apart from each other having a predetermined distance. The distance between each of the paraboloid mirrors 3 is aligned with the distance between the arranged LDs 1.

The paraboloid mirror array 30 as the optical element illustrated in FIG. 4 may be formed by molding a glass material, or by cutting or molding a metal component.

When the paraboloid mirrors 3 each form a part of a different paraboloid shape, the paraboloid mirrors 3 may be discontinuously formed as illustrated in FIG. 4.

When the paraboloid mirror array 30 is manufactured by glass forming by use of a mold, it is desirable that the paraboloid mirror array 30 shows less unevenness to prevent a shear drop from occurring when the paraboloid mirror array 30 is removed from the mold. That is, it is desirable that the distance between the base member 6 and an end point of a paraboloid mirror 3 is short in the Y axis direction.

Accordingly, it is desirable that the gaps between the paraboloid mirrors 3 are filled with a glass material or metal material having a smooth curve, such as spline curve, which passes through the end points of the paraboloid mirrors 3. Thus, the unevenness on the surface of the paraboloid mirror array 30 can be reduced, resulting in preventing a shear drop at the time of molding described above.

In addition, the base member 6 does not need to be plate-shaped, but may be of curved shape, for example.

Instead of the structure in which the base member 6 is provided with the paraboloid mirrors 3, the paraboloid mirror array may have a step-wise shape having a constant thickness and a plurality of reflective surfaces. Such a paraboloid mirror array may be made by press-molding a planar metal plate, for example. In addition, the reflective surfaces of the paraboloid mirrors 3 are coated. The coating material may be a metal reflective film such as aluminum or silver, or a dielectric multi-layer film. When a dielectric multi-layer film is employed, the reflectivity thereof should be maximum at the wavelength of the light flux emitted from the LDs iso that light utilization efficiency is enhanced.

The LDs generally emit linearly-polarized light. When the plurality of LDs 1 is arranged such that the polarization direction of the light flux from each of the LDs 1 is parallel to the X axis direction, the reflectivity on the paraboloid mirrors 3 in the YZ cross-section is enhanced and the light utilization efficiency can be further enhanced.

As illustrated in FIG. 2A, light fluxes from the LDs 1 need to be reflected at a sharper angle in the YZ cross-section than in other cross-sections such that all the light fluxes from the LDs 1 arranged in the Z axis direction can be incident on the mirror unit 40.

To that end, it is desirable that the plurality of LDs 1 is arranged such that the polarization direction of light fluxes from the LDs 1 is parallel to the X axis direction to enhance the reflectivity on the paraboloid mirrors 3 in the YZ cross-section.

The incident angle of the light flux emitted from an LD 1 entering each of the paraboloid mirrors 3 differs for each paraboloid mirror 3. This is because the paraboloid mirror array 30 is configured such that the angle formed between the optical axis of the concave lens 5 and a paraboloid mirror 3 becomes smaller as the light flux is incident farther away from the optical axis of the concave lens 5 on the paraboloid mirror 3 that guides the light flux to the mirror unit 40.

Thus, by adjusting the coating of each of the paraboloid mirrors 3 in such a manner that the reflectivity thereof is maximum at the incident angle of the light flux entering the paraboloid mirror 3 from the LD 1, the light utilization efficiency is further enhanced.

The present invention is not limited to the structure in which the coating is adjusted by each of the paraboloid mirrors 3. The coating may be the same for all the paraboloid mirrors 3.

In such a structure, it is desirable to employ a coating having a range of an incident angle at which the reflectivity is maximum instead of employing the coating with which the reflectivity becomes maximum at a predetermined incident angle.

The incident angle of the light flux emitted from an LD 1 entering each paraboloid mirror 3 corresponds to the angle formed between a normal line and an incident light beam. The normal line is formed where, out of the light fluxes emitted from the LD 1, a light beam passing through the optical axis of the collimator lens 2 is incident, on the paraboloid mirror 3.

The angle formed between the optical axis of the concave lens 5 and a paraboloid mirror 3 may be the angle formed between a line connecting the end points of the paraboloid mirrors 3 and the optical axis of the concave lens 5. Further, the angle formed between the optical axis of the concave lens 5 and a paraboloid mirror 3 may be the angle formed between a tangential line and the optical axis of the concave lens 5, on the paraboloid mirror 3. The tangential line is formed where, out of the light flux from the LD 1, the light beam passing through the optical axis of the collimator lens 2 is incident.

According to the present exemplary embodiment, all the LDs 1 emit the blue light, but the present invention is not limited thereto.

For example, the plurality of LDs 1 may include a blue light LD, a red light LD, and a green light LD. Further, the plurality of LDs 1 may include the blue light LD and the red light LD.

As described above, if the plurality of LDs 1 includes LDs each of which has a mutually different wavelength, the coating of the individual paraboloid mirrors 3 may be different according to the wavelength from a LD. Further, when the plurality of LDs 1 includes the blue, red, and green light LDs, the above-described dichroic mirror 12 and the fluorescent body 13 may not be provided.

The following will describe how the light flux exiting from the mirror unit 40 travels toward the subsequent system via the concave lens 5.

A plurality of convergent light fluxes exiting from the paraboloid mirror arrays 30 is reflected on the mirror unit 40 and enters the concave lens 5.

The concave lens 5 is a meniscus lens having negative power and having a convex side where the light fluxes from the LDs 1 are incident.

As described above, when no mirror unit 40 is provided, the plurality of convergent light fluxes from the paraboloid mirror arrays 30 is condensed onto the common focal point F as illustrated in FIG. 3A.

Figure 5:
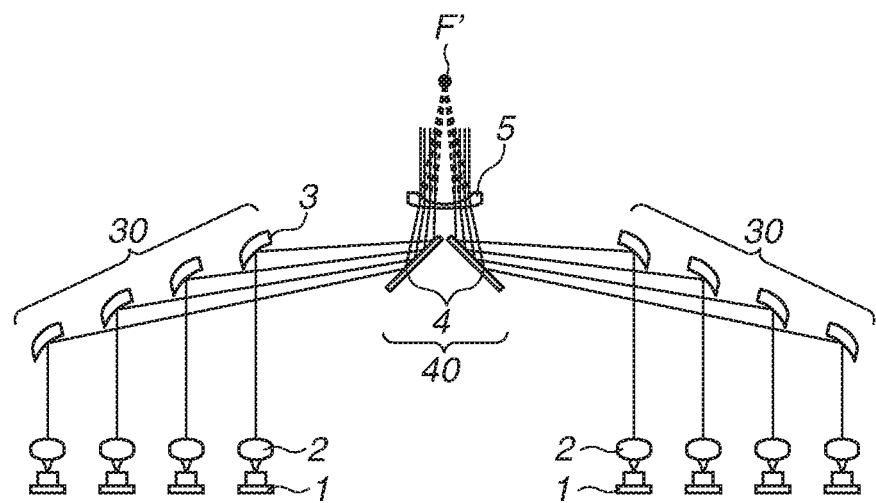
FIG. 5 is an explanatory diagram illustrating a relationship between a focal point of the paraboloid mirror arrays and a focal point of a concave lens according to the exemplary embodiment of the present invention.

Further, according to the present exemplary embodiment, in a case where the focal point of the concave lens is F' as illustrated in FIG. 5, when no concave lens 5 exists, the plurality of the convergent light fluxes from the mirror unit 40 is condensed onto the focal point F'.

More specifically, the focal point of each of the paraboloid mirrors 3 and the focal point of the concave lens 5 overlap each other. With such a structure, the concave lens 5 can convert the convergent light fluxes transmitted from the mirror unit 40 into parallel light fluxes.

When the concave lens 5 is configured of a spherical lens, spherical aberration appears. As a result, parallelism of the light fluxes from the concave lens 5 can be reduced.

In such a case, by adjusting the position of the focal point of the paraboloid mirrors 3 in such a manner as to compensate for the spherical aberration due to the concave lens 5, a reduction in parallelism of light fluxes from the concave lens 5 is prevented.

More specifically, the paraboloid mirror array 30 is configured such that the angle between the optical axis of the concave lens 5 and a paraboloid mirror 3 becomes smaller as a light flux which the paraboloid mirror 3 guides is incident farther away from the optical axis of the concave lens 5 to the mirror unit 40. In other words, in the paraboloid mirror array 30, the farther away a paraboloid mirror 3 is separated from the concave lens 5, the smaller the angle that is formed between the optical axis of the concave lens 5 and the paraboloid mirror 3.

Such a structure prevents the spherical aberration due to the concave lens 5, while the plurality of convergent light fluxes from the paraboloid mirrors 3 can be condensed onto a smaller range on the fluorescent body.

The exemplary embodiment according to the present invention has been described above, but the present invention is not limited to the exemplary embodiment, and can be variously modified and changed within the scope of the present invention.

Other Exemplary Embodiments

The above exemplary embodiment describes the structure in which the light flux from the paraboloid mirror array is turned into the parallel light flux by the concave lens, that is, the structure in which the lens unit has negative power. However, the present invention is not limited thereto. In the case of an optical apparatus that can downsize a light source apparatus while preventing a reduction in light utilization efficiency, a convex lens may be provided deeper in the Y axis direction than a condensing position of the light fluxes coming from the mirror unit 40, for example. That is, the lens unit may have positive power. In such a structure, the convex lens is provided such that the focal point of the convex lens is located at the condensing position of the light fluxes from the mirror unit 40.

The above exemplary embodiment describes the structure in which the plurality of paraboloid mirrors 3 are used as reflective surfaces and as concave mirrors, but the present invention is not limited thereto. For example, a plurality of planar mirrors may be employed as reflective surfaces, and second positive lenses may be provided between the collimator lenses 2 and the planar mirrors, to guide the convergent light fluxes to the planar mirrors. The second positive lenses convert the parallel light fluxes from the collimator lenses 2 into the convergent light fluxes. In other words, the light fluxes from the plurality of light sources are not limited to the parallel light fluxes, and the reflective surfaces are not limited to the concave mirrors including the paraboloid surfaces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-201811, filed Sep. 30, 2014, and No. 2015-176821, filed Sep. 8, 2015, which are hereby incorporated by reference herein in their entirety.

What is claimed is:

1. An optical unit comprising:
a plurality of reflective surfaces configured to reflect light fluxes from a plurality of light sources and to guide the light fluxes to a lens unit,
wherein the reflective surfaces are configured such that the light fluxes reflected on the reflective surfaces are a plurality of convergent light fluxes and such that a distance between each of the convergent light fluxes decreases with distance travelled from the reflective surfaces,
each of the reflective surfaces is each of a plurality of concave mirrors,
each of the concave mirrors is a part of a different one of a plurality of concave surfaces and each of the concave surfaces has a different shape from each other,
the concave mirrors include a first concave mirror and a second concave mirror, the second concave mirror being provided at a position from the lens unit that is further from the lens unit than the first concave mirror, and
a focal length of the second concave mirror is longer than a focal length of the first concave mirror.

2. The optical unit according to claim 1,
wherein each of the concave surfaces is a paraboloid surface.

3. The optical unit according to claim 1,
wherein at least one of the reflective surfaces is configured such that a light flux from the reflective surface travels in a direction different from the light sources.

4. An optical apparatus comprising:
an optical unit;
a lens unit; and
a mirror unit configured to guide light fluxes from the optical unit to the lens unit,
wherein the optical unit includes a plurality of reflective surfaces configured to reflect light fluxes from a plurality of light sources and to guide the light fluxes to the lens unit, and
wherein the reflective surfaces are configured such that the light fluxes reflected on the reflective surfaces are a plurality of convergent light fluxes and such that a distance between each of the convergent light fluxes decreases with distance travelled from the reflective surfaces,
each of the reflective surfaces is each of a plurality of concave mirrors,
each of the concave mirrors is a part of a different one of a plurality of concave surfaces and each of the concave surfaces has a different shape from each other,
the concave mirrors include a first concave mirror and a second concave mirror, the second concave mirror being provided at a position from the lens unit that is further from the lens unit than the first concave mirror, and
a focal length of the second concave mirror is longer than a focal length of the first concave mirror, and
the lens unit is configured to convert the convergent light fluxes from the mirror unit into a plurality of mutually-parallel light fluxes.

5. The optical apparatus according to claim 4,
wherein the lens unit includes a meniscus lens which has negative power and in which an incident side where the light fluxes enter from the light sources is convex.

6. The optical apparatus according to claim 4,
wherein, in a case where a first cross-section is a surface including an optical axis of the lens unit and parallel to a long side of the mirror unit and a second cross-section is a surface orthogonal to the first cross-section and including the optical axis of the lens unit, out of the reflective surfaces, reflective surfaces provided symmetrically with reference to the first cross-section or the second cross-section constitute a part of a same paraboloid shape.

7. A light source apparatus comprising:
a plurality of light sources;
a plurality of positive lenses where a plurality of light fluxes from the light sources is each incident;
an optical apparatus;
a wavelength conversion device configured to convert a part of light fluxes from the optical apparatus into converted light having a wavelength different from a wavelength of the light fluxes from the optical apparatus and to emit the converted light and non-converted light having a wavelength same as the wavelength of the light fluxes from the optical apparatus; and
a dichroic mirror,
wherein the optical apparatus includes:
an optical unit;
a lens unit; and
a mirror unit configured to guide light fluxes from the optical unit to the lens unit,
wherein the optical unit includes a plurality of reflective surfaces configured to reflect light fluxes from the light sources and to guide the light fluxes to the lens unit, and
wherein the reflective surfaces are configured such that the light fluxes reflected on the reflective surfaces are a plurality of convergent light fluxes, and such that a distance between each of the convergent light fluxes decreases with distance travelled from the reflective surfaces,
each of the reflective surfaces is each of a plurality of concave mirrors,
each of the concave mirrors is a part of a different one of a plurality of concave surfaces and each of the concave surfaces has a different shape from each other,
the concave mirrors include a first concave mirror and a second concave mirror, the second concave mirror being provided at a position from the lens unit that is further from the lens unit than the first concave mirror,
a focal length of the second concave mirror is longer than a focal length of the first concave mirror,
the lens unit is configured to convert the convergent light fluxes coming from the mirror unit to a plurality of mutually-parallel light fluxes, and
the dichroic mirror is configured such that the light fluxes from the optical apparatus are incident on the wavelength conversion device via the dichroic mirror.

8. The light source apparatus according to claim 7, wherein the plurality of light sources is configured such that a polarization direction of the light fluxes from the light sources is orthogonal to a cross-section which is parallel to the optical axes of the positive lenses and the normal line of the mirror unit.

9. A projection display apparatus comprising:
a light source apparatus;
a light modulation device;
a color separation-combination system configured to divide a light flux from the light source apparatus into a plurality of light fluxes, to guide the light fluxes to the light modulation device, and to combine the light fluxes from the light modulation device; and
an illumination optical system configured to guide the light fluxes from the light source apparatus to the color separation-combination system,
wherein the light source apparatus includes:
a plurality of light sources;
a plurality of positive lenses where a plurality of light fluxes from the light sources are each incident;
an optical apparatus;
a wavelength conversion device configured to convert a part of light fluxes from the optical apparatus into converted light having a wavelength different from a wavelength of the light fluxes from the optical apparatus and to emit the converted light and non-converted light having a wavelength same as the wavelength of the light fluxes from the optical apparatus; and
a dichroic mirror,
wherein the optical apparatus includes:
an optical unit;
a lens unit; and
a mirror unit configured to guide light fluxes from the optical unit to the lens unit,
wherein the optical unit includes a plurality of reflective surfaces configured to reflect light fluxes from the light sources and to guide the light fluxes to the lens unit,
wherein the reflective surfaces are configured such that the light fluxes reflected on the reflective surfaces are a plurality of convergent light fluxes, and such that a distance between each of the convergent light fluxes decreases with distance travelled from the reflective surfaces,
each of the reflective surfaces is each of a plurality of concave mirrors,
each of the concave mirrors is a part of a different one of a plurality of concave surfaces and each of the concave surfaces has a different shape from each other,
the concave mirrors include a first concave mirror and a second concave mirror, the second concave mirror being provided at a position from the lens unit that is further from the lens unit than the first concave mirror,
a focal length of the second concave mirror is longer than a focal length of the first concave mirror,
the lens unit is configured to convert the convergent light fluxes from the mirror unit into mutually-parallel light fluxes, and
the dichroic mirror is configured such that light fluxes from the optical apparatus are incident on the wavelength conversion device via the dichroic mirror.

10. An optical unit comprising:
a plurality of reflective surfaces configured to reflect light fluxes from a plurality of light sources,
wherein the reflective surfaces are configured such that the light fluxes reflected on the reflective surfaces are a plurality of convergent light fluxes and such that a distance between each of the convergent light fluxes decreases with distance travelled from the reflective surfaces,
the reflective surfaces includes a first concave mirror and a second concave mirror, the second concave mirror being provided at a position different from the first concave mirror, and
a focal length of the second concave mirror is different from a focal length of the first concave mirror.

11. The optical unit according to claim 10,
wherein the first concave mirror is a part of a first concave surface and the second concave mirror is a part of a second concave surface, the second concave surface has a different shape from the first concave surface.

12. An optical apparatus comprising:
an optical unit;
a lens unit; and
a mirror unit configured to guide light fluxes from the optical unit to the lens unit,
wherein the optical unit includes a plurality of reflective surfaces configured to reflect light fluxes from a plurality of light sources, and
wherein the reflective surfaces are configured such that the light fluxes reflected on the reflective surfaces are a plurality of convergent light fluxes and such that a distance between each of the convergent light fluxes decreases with distance travelled from the reflective surfaces,
the reflective surfaces include a first concave mirror and a second concave mirror, the second concave mirror being provided at a position different from the first concave mirror, and a focal length of the second concave mirror is different from a focal length of the first concave mirror, and the lens unit is configured to convert the convergent light fluxes from the mirror unit into a plurality of mutually-parallel light fluxes.

13. The optical apparatus according to claim 12, wherein the first concave mirror is a part of a first concave surface and the second concave mirror is a part of a second concave surface, the second concave surface has a different shape from the first concave surface.

14. The optical apparatus according to claim 12, wherein, in a case where a first cross-section is a surface including an optical axis of the lens unit and parallel to a long side of the mirror unit and a second cross-section is a surface orthogonal to the first cross-section and including the optical axis of the lens unit, the reflective surfaces include a third concave mirror and a fourth concave mirror, the fourth concave mirror being provided at a position symmetric to the third concave mirror with reference to the first cross-section or the second cross-section, and the third concave mirror is a part of a third concave surface and the fourth concave mirror is a part of a fourth concave surface, the fourth concave surface has a same shape with the third concave surface.

15. A light source apparatus comprising:
a plurality of light sources;
a plurality of positive lenses where a plurality of light fluxes from the light sources is each incident;
an optical apparatus;
a wavelength conversion device configured to convert a part of light fluxes from the optical apparatus into converted light having a wavelength different from a wavelength of the light fluxes from the optical apparatus and to emit the converted light and non-converted light having a wavelength same as the wavelength of the light fluxes from the optical apparatus; and
a dichroic mirror,
wherein the optical apparatus includes:
an optical unit;
a lens unit; and
a mirror unit configured to guide light fluxes from the optical unit to the lens unit,
wherein the optical unit includes a plurality of reflective surfaces configured to reflect light fluxes from the light sources, and
wherein the reflective surfaces are configured such that the light fluxes reflected on the reflective surfaces are a plurality of convergent light fluxes, and such that a distance between each of the convergent light fluxes decreases with distance travelled from the reflective surfaces,
the reflective surfaces include a first concave mirror and a second concave mirror, the second concave mirror being provided at a position different from the first concave mirror,
a focal length of the second concave mirror is different from a focal length of the first concave mirror,
the lens unit is configured to convert the convergent light fluxes coming from the mirror unit to a plurality of mutually-parallel light fluxes, and the dichroic mirror is configured such that the light fluxes from the optical apparatus are incident on the wavelength conversion device via the dichroic mirror.

16. The light source apparatus according to claim 15, wherein the first concave mirror is a part of a first concave surface and the second concave mirror is a part of a second concave surface, the second concave surface has a different shape from the first concave surface.

17. A projection display apparatus comprising:
a light source apparatus;
a light modulation device;
a color separation-combination system configured to divide a light flux from the light source apparatus into a plurality of light fluxes, to guide the light fluxes to the light modulation device, and to combine the light fluxes from the light modulation device; and
an illumination optical system configured to guide the light fluxes from the light source apparatus to the color separation-combination system,
wherein the light source apparatus includes:
a plurality of light sources;
a plurality of positive lenses where a plurality of light fluxes from the light sources are each incident;
an optical apparatus;
a wavelength conversion device configured to convert a part of light fluxes from the optical apparatus into converted light having a wavelength different from a wavelength of the light fluxes from the optical apparatus and to emit the converted light and non-converted light having a wavelength same as the wavelength of the light fluxes from the optical apparatus; and
a dichroic mirror,
wherein the optical apparatus includes:
an optical unit;
a lens unit; and
a mirror unit configured to guide light fluxes from the optical unit to the lens unit,
wherein the optical unit includes a plurality of reflective surfaces configured to reflect light fluxes from the light sources,
wherein the reflective surfaces are configured such that the light fluxes reflected on the reflective surfaces are a plurality of convergent light fluxes, and such that a distance between each of the convergent light fluxes decreases with distance travelled from the reflective surfaces,
the reflective surfaces include a first concave mirror and a second concave mirror, the second concave mirror being provided at a position different from the first concave mirror,
a focal length of the second concave mirror is different from a focal length of the first concave mirror,
the lens unit is configured to convert the convergent light fluxes from the mirror unit into mutually-parallel light fluxes, and
the dichroic mirror is configured such that light fluxes from the optical apparatus are incident on the wavelength conversion device via the dichroic mirror.

18. The projection display apparatus according to claim 17, wherein the first concave mirror is a part of a first concave surface and the second concave mirror is a part of a second concave surface, the second concave surface has a different shape from the first concave surface.

* * * * *